March 21, 1944.    G. CALOW ET AL    2,344,595
INDICATOR MICROMETER
Filed Sept. 22, 1942
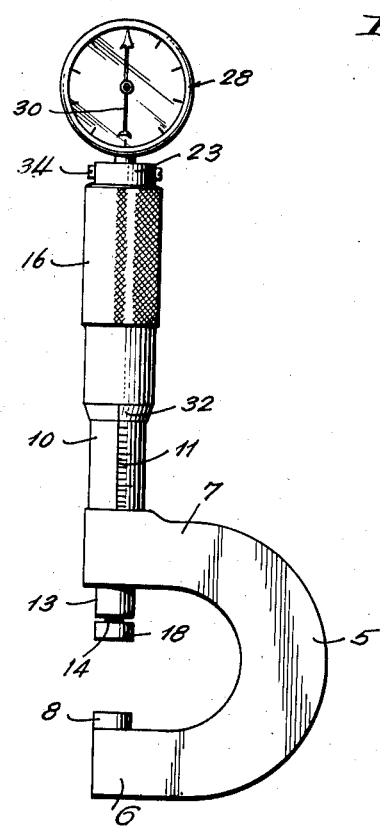
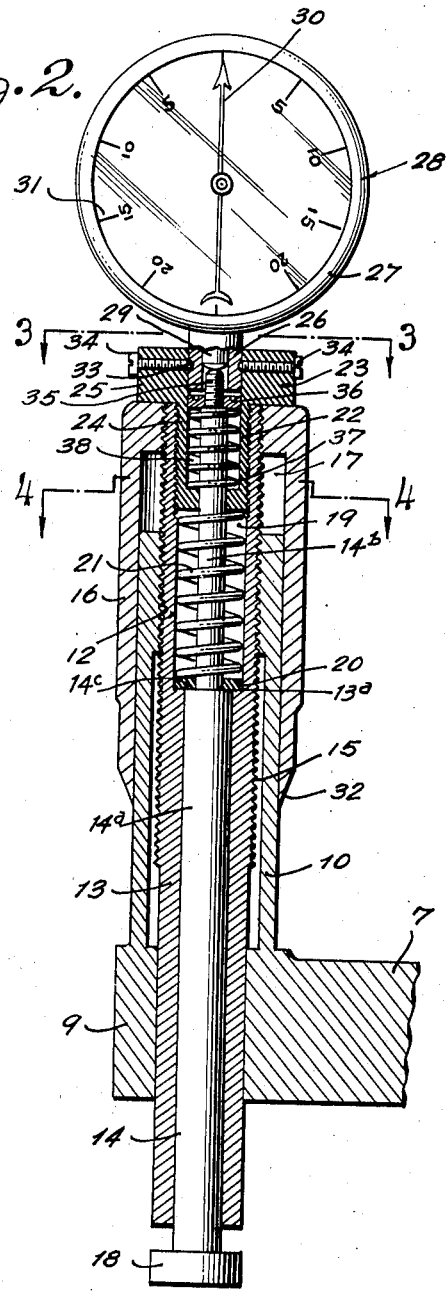
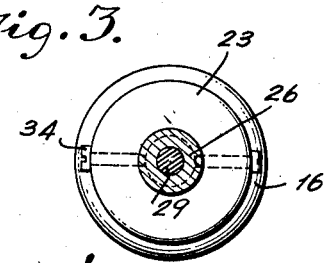
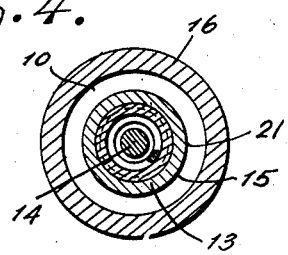
INVENTORS
GRETCHEN CALOW
OTTO CALOW
BY
Oscar A. Geier
ATTORNEY Patented Mar. 21, 1944

2,344,595

UNITED STATES PATENT OFFICE 2,344,595

INDICATOR MICROMETER

Gretchen Calow and Otto Calow, Albany, N. Y.

Application September 22, 1942, Serial No. 459,249

3 Claims. (Cl. 33—147)

This invention relates to micrometer calipers and similar tools.

Micrometer calipers measure the width or diameter of a work piece situated between an anvil and the end of a spindle which is moved in relation to the anvil by the rotation of a thimble connected with a micrometer screw which carries the spindle. Thus the reading of the caliper depends upon the final position of the rotary thimble.

We found that these calipers are not altogether satisfactory for very accurate measurements, since different operators when measuring the same workpiece may obtain readings which differ one from the other, particularly as far as the last digit or digits are concerned. This may be explained by the fact that the operators are accustomed to employ different degrees of pressure when rotating the thimble, and then the spindle is pressed with a different force against the work piece. Furthermore, a certain amount of play may be found even in well constructed micrometer calipers. In the final analysis, an operator relies upon his sense of touch in determining the final position of the thimble.

An object of the present invention is the provision of a micrometer caliper or similar tool which is so constructed that its final reading will be given automatically, eliminating manual adjustment and the necessity of relying upon the sense of touch.

Micrometer calipers constructed in accordance with the present invention are particularly suited for the type of work wherein a measuring tool is set in advance to a predetermined length; another object of the invention is to provide said measuring tool with means for automatically indicating the excess of the width or diameter of a work piece over the set length.

A further object is to utilize an indicator of the spring type for obtaining precise readings of a measuring tool of the caliper type.

Other objects of the present invention will become apparent in the course of the following specification.

The objects of the present invention may be realized by forming the spindle of a micrometer caliper, or similar tool, of two preferably concentric parts, the outer part constituting the micrometer screw, which the inner part may be moved in relation to the outer part by the pressure of a work piece to actuate the pin of an indicator of the usual spring type. A spring situated between the two parts returns the movable part to its original position when pressure is released, and a second spring situated between said parts prevents movements of the spindle.

The invention will appear more clearly from the following detailed description when taken in connection with the accompanying drawing showing, by way of example only, a preferred embodiment of the inventive idea.

In the drawing:

Figure 1 shows in side elevation a micrometer caliper constructed in accordance with the principles of the present invention.

Figure 2 is a longitudinal section through a part of the caliper, on an enlarged scale.

Figure 3 is a transverse section along the line 3—3 of Figure 2.

Figure 4 is a transverse section along the line 4—4 of Figure 2.

The micrometer caliper shown in the drawing includes the usual U-shaped frame 5 having two leg portions 6 and 7. The portion 6 carries an anvil 8 which is firmly mounted therein.

The portion 7 includes a sleeve 9 and a barrel 10 which may be integral with the sleeve and which is provided with the usual scale 11. The barrel 10 is provided with the usual inner screw threads 12.

In accordance with the present invention, the spindle of the micrometer caliper includes an outer sleeve 13 and an inner rod 14 situated within the sleeve 13. The outer sleeve 13 includes the micrometer screw 15 which meshes with the screw threads 12.

The sleeve 13 has an end which is firmly connected with a thimble 16. The thimble 16 is of the usual form; it rotates along with the sleeve 13 and is concentrical in relation thereto; the barrel 10 extends between the thimble 16 and the sleeve 13, a space 17 being provided beyond the barrel 10 between the sleeve 13 and the thimble to allow downward movement of the thimble and rotation of the sleeve 13 for adjustment of the sleeve and rod downward and relatively to the anvil 8.

The rod 14 has an inner or lower end which is integral with an end disc 18. The disc 18 may be lapped square with the anvil 8 for all positions.

The sleeve 13 has an enlarged inner chamber or recess 19 at its upper end containing a disc 20 and a coiled spring 21 one end of which presses against the disc 20.

The outer end of the sleeve 13 is provided with inner screw threads 22. A bushing 23 has a sleeve portion 24 which is screwed into the threads 22. The outer end of the rod 14 extends through the sleeve 24. The bushing 23 also has a wider head portion 25 which rests upon the interconnected outer ends of the sleeve 13 and the thimble 16. One end of the spring 21 rests against the sleeve portion 24 of the bushing 23.

The portion 25 of the bushing 23 has a recess adapted to receive a sleeve 26 which constitutes an integral part of the casing 27 of a spring-actuated indicator 28; the sleeve 26 has recesses or grooves 33 receiving the ends of screws 34 which are carried by the bushing 23.

The indicator 28 is of the usual construction and is not illustrated in detail in the drawing. It includes an actuating pin 29 situated within the sleeve 26 and connected by the usual resilient means (not shown) with a hand 30 swingable over a dial or scale 31 of the indicator 28. The pin 29 is in engagement with the outer end 35 of the rod 14. The end 35 is threaded and carries a disc 36. A coiled spring 37 is situated within an inner chamber 38 of the bushing 23 and engages the disc 36.

The rod 14 includes a body portion 14a of major diameter and a stem portion 14b of smaller diameter, at the juncture of which a shoulder 14c is found. The portion 14a is of a gauged length such that when the disk 18 is spaced the specified distance from the adjacent end of the sleeve 13 the shoulder 14b alines with a shoulder 13a formed at the inner end of the recess 19 in the sleeve, through which recess and into the recess 38 of the bushing 22 the stem 14b carrying the collar 36 extends. The disk 20 is mounted on the stem 14b and is normally held by the spring 21, in the expanded condition of the latter, in contact with the shoulders 13a and 14c, in which position of said parts the collar 18 is disposed at the predetermined spaced distance from the lower end of the sleeve. The spring 37, which is of smaller size and relatively less strength than the spring 21, is, in the above-described position of the parts of the rod, under slight stress or tension, which may be varied by adjustment of the collar 36 so that said spring exerts its expansive pressure in the opposite direction to that of the spring 21 and against the said collar 36 to support and hold the rod from moving inwardly or downwardly and to hold the outer end of the stem in contact with the part 29 of the indicator 28. By this construction and arrangement of the parts of the rod and the springs, the spring 21 operates to normally hold the rod against upward movement or movement toward the indicator 28 to keep the disk 18 properly spaced from the inner or lower end of the sleeve until sufficient pressure falls upon the disk to overcome the resistance of said spring to the upward movement of the rod, while the spring 37 operates to support the rod and hold the disk 18 against downward movement from its set position and to keep the stem constantly in engagement with part 29 of the indicator. This construction also, by adjustment of collar 36, allows regulation of the effective strength of the spring 37 with relation to the weight of the rod and effective strength of the spring 21, to hold the rod against movement in either direction until upward pressure pulls on the disk sufficiently to overcome the resistance of the spring 21, and to allow adjustment to be made to compensate for any slight wear in the contact end 35 of the stem and the member 29 of the indicator to keep the same in perfect contact.

The tool may be operated for measuring purposes in the usual manner in which a micrometer caliper is used nowadays and in that case the bevelled portion 32 of the thimble 16 may be provided with a scale co-operating with the scale 11, the indicator 28 serving as a means for showing the last digit of the reading. However, a most advantageous manner of using the described tool is to set it to a predetermined reading and then to bring the work piece to be measured between the anvil 8 and the plate 18. If the work piece is wider than the set reading, it will press against the disc 18 and move the rod 14, thereby compressing the spring 21 and moving the pin 29. The pin 29 will actuate the hand 30 which will indicate the excess over the set reading upon the scale 31. The spring 21 will return the rod 14 back to its original position as soon as the work piece is withdrawn.

It is apparent that the invention shown above has been given by way of illustration and not by way of limitation and that the above described tool is subject to wide variations and modifications without departing from the scope or intent of the present invention. All of such variations and modifications are to be included within the scope of the present invention.

What is claimed is:

1. A measuring tool, comprising in combination an anvil, a sleeve movable toward and from said anvil, a rod situated within said sleeve and movable longitudinally in opposite directions therein, one end of said rod projecting beyond one end of said sleeve and the other end of the sleeve having a recess therein, a disk upon the projecting end of the rod and situated at a distance from the adjacent end of the sleeve, whereby the distance between said disk and said anvil may be measured, a second disk carried by said rod intermediate its ends and situated in said recess formed in said sleeve, the sleeve having a shoulder against which said second disk is adapted to abut, a recessed bushing carried by said sleeve and closing said recess in the sleeve, a coiled spring situated within said recess in the sleeve and engaging said second disk and said bushing to hold the second disk pressed against the shoulder of the sleeve, and indicator carried by said bushing and comprising an actuating pin contacting the other end of said rod, whereby a change in pressure upon the first-mentioned end of the rod which causes a movement of the rod in the direction toward the indicator is indicated upon said indicator, said spring serving to yieldingly oppose such movement of the rod, and a second spring housed in the recessed bushing and acting on the rod to oppose movement of the rod away from the indicator and to hold the second named end of the rod in contact with the actuating pin.

2. A measuring tool, comprising a U-shaped frame, an anvil carried by one leg of the U-shaped frame, a sleeve extending through the other leg of the U-shaped frame, a barrel firmly connected at one end with said other leg and enclosing said sleeve, said sleeve and said barrel having inter-engaging screw threads, a rod situated within said sleeve and movable longitudinally in opposite directions therein, the inner end of said rod being arranged to project beyond the inner end of said sleeve and the outer end of the sleeve having a recess therein, a disk upon the projecting inner end of the rod and situated at a distance from said inner end of the sleeve, whereby the distance between said disk and said anvil may be measured, a second disk carried by said rod intermediate its ends and situated in the recess formed in said sleeve, the rod having a shoulder at the inner end of the recess against which said second disk is adapted to abut, a bushing fitted in the outer end of the recess in the sleeve, a coiled spring situated within said recess in the sleeve and engaging said second disk and said bushing and normally serving to oppose movement of the rod toward the indicator in engagement with the shoulder on the rod and to hold the second disk, an indicator having a sleeve fitted in and secured to said bushing and an actuating pin projecting through said indicator sleeve and contacting the outer end of the rod, whereby a change in pressure upon the first-mentioned end of the rod which causes movement of the rod in the direction of the indicator is indicated upon said indicator, means locking the indicator sleeve in said bushing, and a second spring housed in the recessed bushing and acting on the rod to oppose movement of the rod away from the indicator and to hold the second-named end of the rod in contact with the actuating pin.

3. A measuring tool comprising a U-shaped frame, an anvil carried by one leg of the U-shaped frame, a sleeve extending at its inner end through the other leg of the U-shaped frame, a barrel firmly connected with said frame and enclosing said sleeve, said sleeve and said barrel having interengaging screw threads and said sleeve having its inner portion formed with a bore and its outer portion formed with a recess of greater diameter than the bore and terminating at its inner end in a shoulder, a movable rod comprising a body portion situated within the bore of said sleeve and having its inner end projecting beyond the inner end of said sleeve, whereby the distance between said end of the rod and said anvil may be measured, the rod having a shoulder at the outer end of its body portion and a reduced stem projecting beyond said shoulder into the recess of the sleeve, a disk surrounding the stem and bearing on said shoulder, a bushing closing the outer end of the recess in the sleeve and receiving the stem of the rod, an indicator having a portion fitting within said bushing and an actuating pin projecting through said portion and contacting the free end of the stem of the rod, whereby a change in pressure upon the first-mentioned end of the rod which causes movement of the rod in the direction of the indicator is indicated upon said indicator, a disk carried by the stem of the rod, a coiled spring situated in the recess of the sleeve about the stem between said bushing and the first-named disk and normally pressing said disk against the shoulder at the inner end of the recess of the sleeve to yieldingly oppose movement of the rod toward the indicator, and a second spring located about the stem and within the bushing and exerting pressure on the second-named disk to oppose movement of the rod away from the indicator and hold the free end of the stem in contact with the actuating pin of the indicator.

GRETCHEN CALOW.
OTTO CALOW.